US012724825B2

(12) United States Patent
Nishikawa et al.

(10) Patent No.: US 12,724,825 B2
(45) Date of Patent: Sep. 1, 2026

(54) CAUSALITY SEARCH SYSTEM AND STORAGE MEDIUM

(71) Applicant: SCREEN Holdings Co., Ltd., Kyoto (JP)

(72) Inventors: Kouhei Nishikawa, Kyoto (JP); Takashi Ikeuchi, Kyoto (JP); Genya Haraoka, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 19/001,682

(22) Filed: Dec. 26, 2024

(65) Prior Publication Data

US 2025/0231988 A1 Jul. 17, 2025

(30) Foreign Application Priority Data

Jan. 15, 2024 (JP) ................................ 2024-003772

(51) Int. Cl.
*G06F 16/901* (2019.01)
*G06F 16/9038* (2019.01)

(52) U.S. Cl.
CPC ...... *G06F 16/9024* (2019.01); *G06F 16/9038* (2019.01)

(58) Field of Classification Search
CPC ......................... G06F 16/9024; G06F 16/9038
See application file for complete search history.

(56) References Cited

U.S. PATENT DOCUMENTS 11,321,885 B1 * 5/2022 Du ........................ G06T 11/206
11,526,791 B2 * 12/2022 Katz .................. G06F 16/9024
2022/0004910 A1 * 1/2022 Wei ........................ G06N 20/10
2023/0325628 A1 * 10/2023 Nisimov ............. G06N 3/0464 706/21
2024/0028669 A1 * 1/2024 Porwal .................. G06F 18/295
2025/0225410 A1 * 7/2025 Bhatia .................... G06N 5/022
2025/0292124 A1 * 9/2025 Ma ......................... G06N 3/045

FOREIGN PATENT DOCUMENTS

EP 4420881 A1 8/2024
JP 2023-062325 A 5/2023

OTHER PUBLICATIONS

Extended European Search Report dated May 20, 2025 of the corresponding European Patent Application No. 24222188.5.
Yusuke Komatsu et al: "Assessing Statistical Reliability of LINGAM via Multiscale Bootstrap", Sep. 15, 2010 (Sep. 15, 2010), Artificial Neural Networks—ICANN 2010, Springer Berlin Heidelberg, Berlin, Heidelberg, pp. 309-314, XP019152512,ISBN: 978-3-642-15824-7.

* cited by examiner

*Primary Examiner* — Charles Rones
(74) *Attorney, Agent, or Firm* — Rimon P.C.

(57) ABSTRACT

First, a plurality of sample datasets is generated from a single original dataset through sampling with replacement. Next, a plurality of causal graphs each showing a causal relationship between the variables using a directed edge is obtained by conducting causality search on each of the plurality of sample datasets. Then, a single causal graph is determined on the basis of the plurality of causal graphs. Thus, it is possible to improve the reliability of the causal graph. Furthermore, a graph selection mode and a directed edge selection mode are switchable to each other in determining the single causal graph. Thus, it is possible to reduce a burden on a user in the work of determining the causal graph.

6 Claims, 9 Drawing Sheets

D0

| | X1 | X2 | X3 | X4 | X5 | X6 |
|---|---|---|---|---|---|---|
| d1 | 215.1 | −21.51 | 1015.2 | 9.7 | 95 | 71.1 |
| d2 | 222.1 | −22.21 | 1014.5 | 14.4 | 60 | 60.5 |
| d3 | 188.7 | −18.87 | 1017.4 | 17.0 | 67 | 22.6 |
| d4 | 265.9 | −26.59 | 1018.8 | 13.3 | 6 | 77.6 |
| d5 | 200.2 | −20.02 | 1019.2 | 13.0 | 39 | 15.9 |
| d6 | 190.0 | −19.00 | 1018.3 | 17.4 | 61 | 16.7 |
| d7 | 245.0 | −24.50 | 1018.6 | 17.5 | 21 | 61.6 |
| d8 | 206.9 | −20.69 | 1019.6 | 16.9 | 77 | 49.2 |

| No. | FREQUENCY OF OCCURRENCE | DEGREE OF CONFORMITY |
|---|---|---|
| 1 | 54 | 76.76 % |
| 2 | 31 | 56.21 % |
| 3 | 12 | 12.17 % |
| 4 | 2 | 5.49 % |
| 5 | 2 | 6.31 % |
| 6 | 1 | 4.91 % |

CAUSALITY SEARCH SYSTEM AND STORAGE MEDIUM

RELATED APPLICATIONS

This application claims the benefit of Japanese Application No. 2024-003772, filed on Jan. 15, 2024, the disclosure of which is incorporated by reference herein.

BACKGROUND OF THE INVENTION

Field of the Invention

The present invention relates to a causality search system and a causality search program for searching for a causal relationship between variables on the basis of a dataset containing a plurality of variables.

Description of the Background Art

According to a statistical causality search program conventionally known such as LiNGAM, a causal relationship between variables is analyzed on the basis of a dataset containing a plurality of variables. The causality search program conducts causality search on the input dataset to generate a causal graph showing a causal relationship between variables using a directed edge.

The conventional causality search program is shown in Japanese Patent Application Laid-Open No. 2023-062325, for example.

The reliability of causality search using the causality search program of this type may be improved by generating a plurality of datasets from an original dataset through sampling with replacement and conducting causality search on each of the plurality of generated datasets, for example.

However, simply combining a plurality of causal graphs obtained by conducting causality search on the plurality of datasets causes an unsuitable situation such as loop formation by some directed edges. This arises a need to sort out a necessary directed edge from directed edges in the plurality of causal graphs. However, a burden on a user in the work of selecting a directed edge becomes heavier as the number of variables becomes larger.

SUMMARY OF THE INVENTION

The present invention is intended to provide a causality search system and a causality search program capable of obtaining a highly reliable causal graph by conducting causality search through sampling with replacement and capable of reducing a burden on a user in the work of determining a causal graph.

A first aspect of the present invention is intended for a causality search system that searches for a causal relationship between variables on the basis of an original dataset containing a plurality of variables. The computer performs: (a) a process of generating a plurality of sample datasets from the original dataset through sampling with replacement; (b) a process of obtaining a plurality of causal graphs each showing a causal relationship between the variables using a directed edge by conducting causality search on each of the plurality of sample datasets; and (c) a process of determining a single causal graph on the basis of the plurality of causal graphs. In the process (c), a graph selection mode and a directed edge selection mode are switchable to each other. The graph selection mode is a mode in which a causal graph to be used as the single causal graph is selected from the plurality of causal graphs obtained by the process (b). The directed edge selection mode is a mode in which a directed edge to be used in the single causal graph is selected from a plurality of the directed edges obtained by the process (b).

According to the present invention, the plurality of causal graphs is obtained by generating the plurality of sample datasets from the single original dataset. Then, the single causal graph is determined from the plurality of causal graphs. Thus, it is possible to improve the reliability of the causal graph. Furthermore, the graph selection mode and the directed edge selection mode are switchable to each other in determining the single causal graph. Thus, it is possible to reduce a burden on a user in the work of determining the causal graph.

In the graph selection mode, a frequency of occurrence of an identical causal graph out of the plurality of causal graphs obtained by the process (b) may be displayed.

Thus, it is possible to select the single causal graph while taking the frequency of occurrence of the identical causal graph into consideration. This makes it possible to reduce a work burden on a user to select the causal graph.

In the graph selection mode, a degree of conformity of each of the plurality of causal graphs obtained by the process (b) to the original dataset may be displayed.

Thus, it is possible to select the single causal graph while taking the degree of conformity of the causal graph to the original dataset into consideration. This makes it possible to reduce a work burden on a user to select the causal graph.

The process (b) may calculate a probability of occurrence of each directed edge in the plurality of causal graphs, and in the directed edge selection mode, directed edges of a predetermined number that are high in the probability of occurrence may be selected.

Thus, it is possible to select the directed edges of the predetermined number automatically on the basis of the probabilities of occurrence of the directed edges. This makes it possible to reduce a work burden on a user to select the directed edge.

The process (b) may calculate a probability of occurrence of each directed edge in the plurality of causal graphs. In connection with any two variables, a probability of occurrence of a first directed edge, a probability of occurrence of a second directed edge, and a probability of occurrence in a state without a directed edge may be displayed in the directed edge selection mode. The first directed edge is directed from one of the variables toward the other variable. The second directed edge is directed from the other variable toward the one variable. Any one may be selected from the first directed edge, the second directed edge, and the state without a directed edge.

Thus, it is possible to select any one to be present between the two variables from the first directed edge, the second directed edge, and the state without a directed edge while taking the probabilities of occurrence into consideration. This makes it possible to reduce a work burden on a user to select the directed edge.

A second aspect of the present invention is intended for a causality search program that causes the computer of the causality search system according to the first aspect to perform the processes (a) to (c) by being installed on the computer.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment of the present invention will be described below by referring to the accompanying drawings.

<1. Configuration of Causality Search System>

Figure 1:
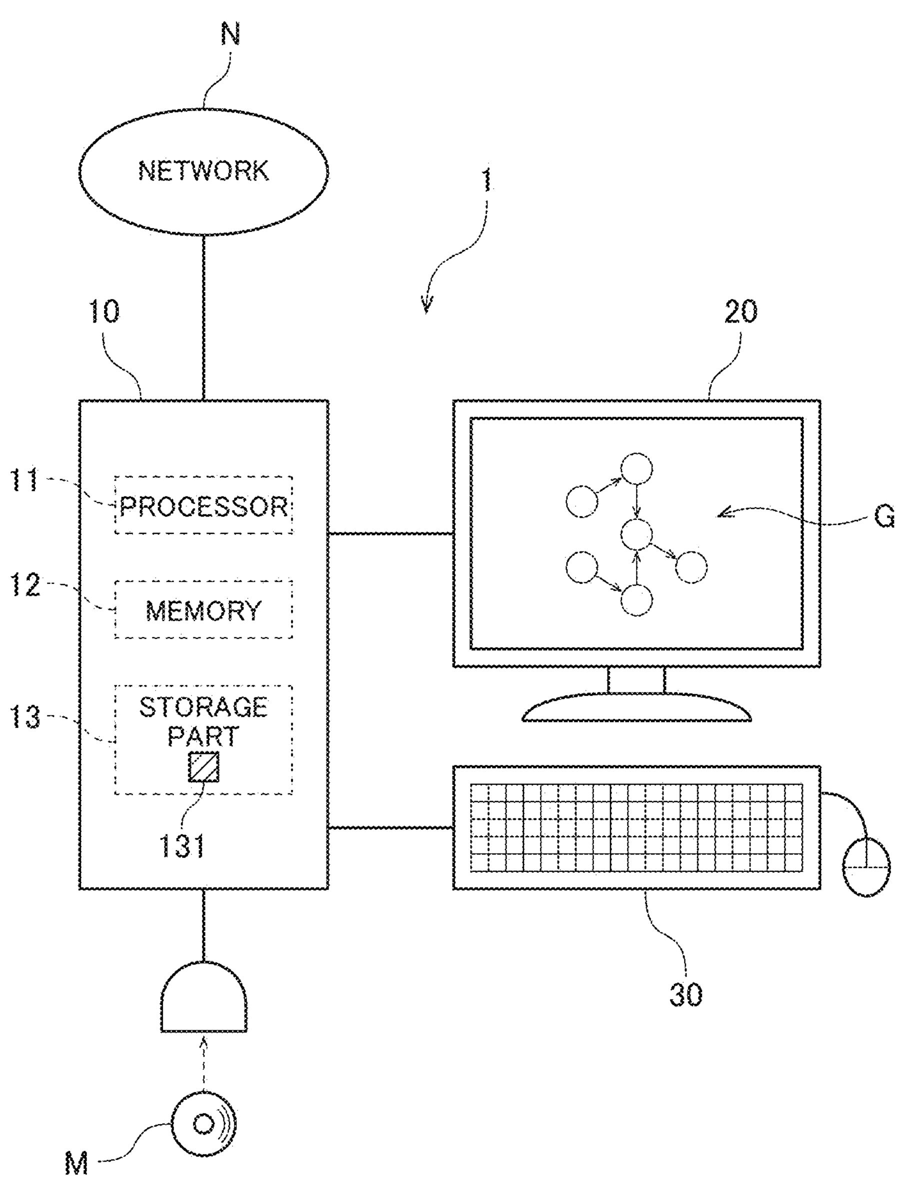
FIG. 1 shows the configuration of a causality search system.

FIG. 1 shows the configuration of a causality search system 1 according to one preferred embodiment of the present invention. The causality search system 1 is a system that searches for a causal relationship between variables on the basis of a dataset containing a plurality of variables, and outputs a visualized causal graph G. As shown in FIG. 1, the causality search system 1 includes a computer 10, a display unit 20, and an input unit 30.

The computer 10 is an information processor for performing processes of causality search. As shown in FIG. 1, the computer 10 includes a processor 11 such as a CPU, a memory 12 such as a RAM, and a storage part 13 such as a hard disk drive.

The storage part 13 stores a causality search program 131. The causality search program 131 is application software that causes the computer 10 to perform processes in step S1 to S6 described later. The causality search program 131 is read from a storage medium M such as a CD or a DVD and installed on the computer 10. However, the causality search program 131 may be downloaded onto the computer 10 through a network N such as the Internet.

The display unit 20 is a device for display of various types of information output from the computer 10. A liquid crystal display is used as the display unit 20, for example. The input unit 30 is a device for input of various types of information to the computer 10. A keyboard or a mouse is used as the input unit 30, for example. The display unit 20 and the input unit 30 may be realized using a single device such as a touch panel display. The display unit 20 and the input unit 30 are electrically connected to the computer 10.

Figure 2:
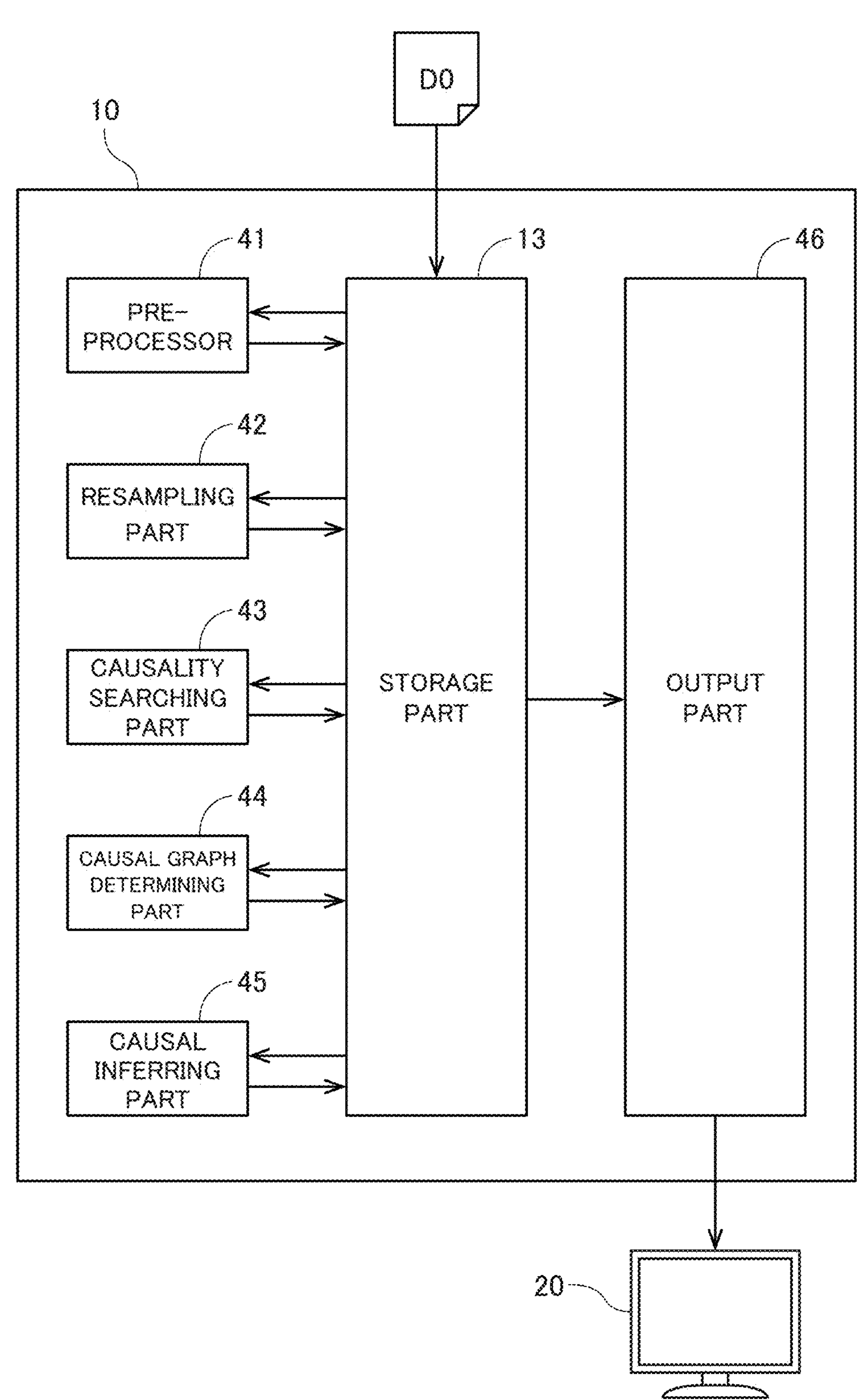
FIG. 2 is a block diagram conceptually showing the function of a computer.

FIG. 2 is a block diagram conceptually showing the function of the computer 10. As shown in FIG. 2, the computer 10 includes a pre-processor 41, a resampling part 42, a causality searching part 43, a causal graph determining part 44, a causal inferring part 45, and an output part 46. The respective functions of the pre-processor 41, the resampling part 42, the causality searching part 43, the causal graph determining part 44, the causal inferring part 45, and the output part 46 are realized by causing the processor 11 of the computer 10 to operate according to the causality search program 131.

Figure 3:
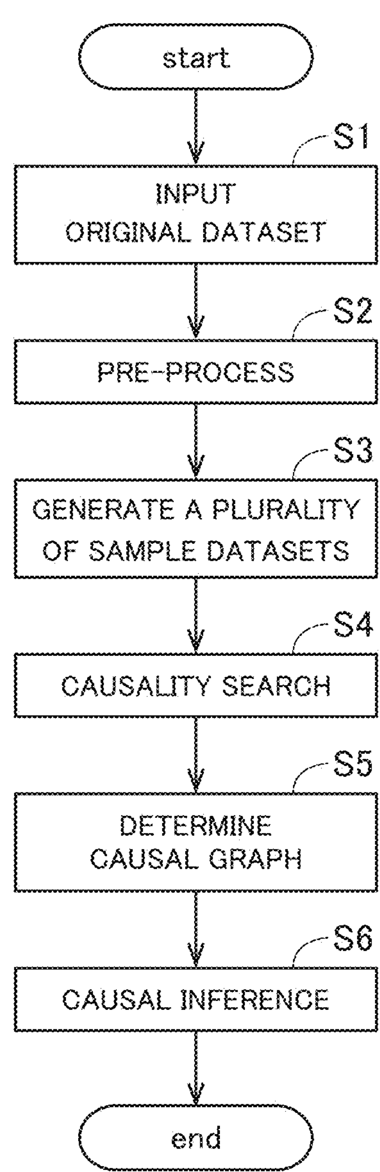
FIG. 3 is a flowchart showing a flow of causality search processing.

FIG. 3 is a flowchart showing a flow of causality search processing by the causality search system 1. The respective functions of the parts in FIG. 2 will be described next in line with the flow of the processing shown in FIG. 3.

In performing the causality search processing, a dataset to be subjected to causality search is first input to the computer 10 (step S1). In the following, the dataset input to the computer 10 in step S1 will be called an "original dataset D0." The original dataset D0 contains various types of measured data relating to a manufacturing device, for example. However, a data type of the original dataset D0 is not limited. The original dataset D0 is stored into the storage part 13 of the computer 10.

Figure 4:
FIG. 4 shows an example of an original dataset.

FIG. 4 shows an example of the original dataset D0. As shown in FIG. 4, the original dataset D0 input to the causality search system 1 is numerical data in a table format. The original dataset D0 contains a plurality of variables X1, X2, X3, . . . . More specifically, the original dataset D0 has a plurality of numerical value groups d1, d2, d3, . . . . Each of the numerical value groups d1, d2, d3, . . . is composed of the plurality of variables X1, X2, X3, . . . .

The output part 46 displays the input original dataset D0 on the display unit 20. At this time, the output part 46 may display a histogram representing a numerical value distribution, each type of statistic such as a mean value, the presence or absence of a missing value, etc. on the display unit 20 that are prepared for each of the variables X1, X2, X3, . . . . This allows a user of the causality search system 1 to see the feature of the numerical value distribution of each of the variables X1, X2, X3, . . . . The computer 10 may be capable of displaying a scatter view on the display unit 20 showing scatter between two variables designated by the user.

Next, the pre-processor 41 of the computer 10 performs a pre-process on the original dataset D0 (step S2). As an example, the pre-processor 41 interpolates a missing value into the original dataset D0. The pre-processor 41 may delete a variable not to be used for causality search, for example.

Figure 5:
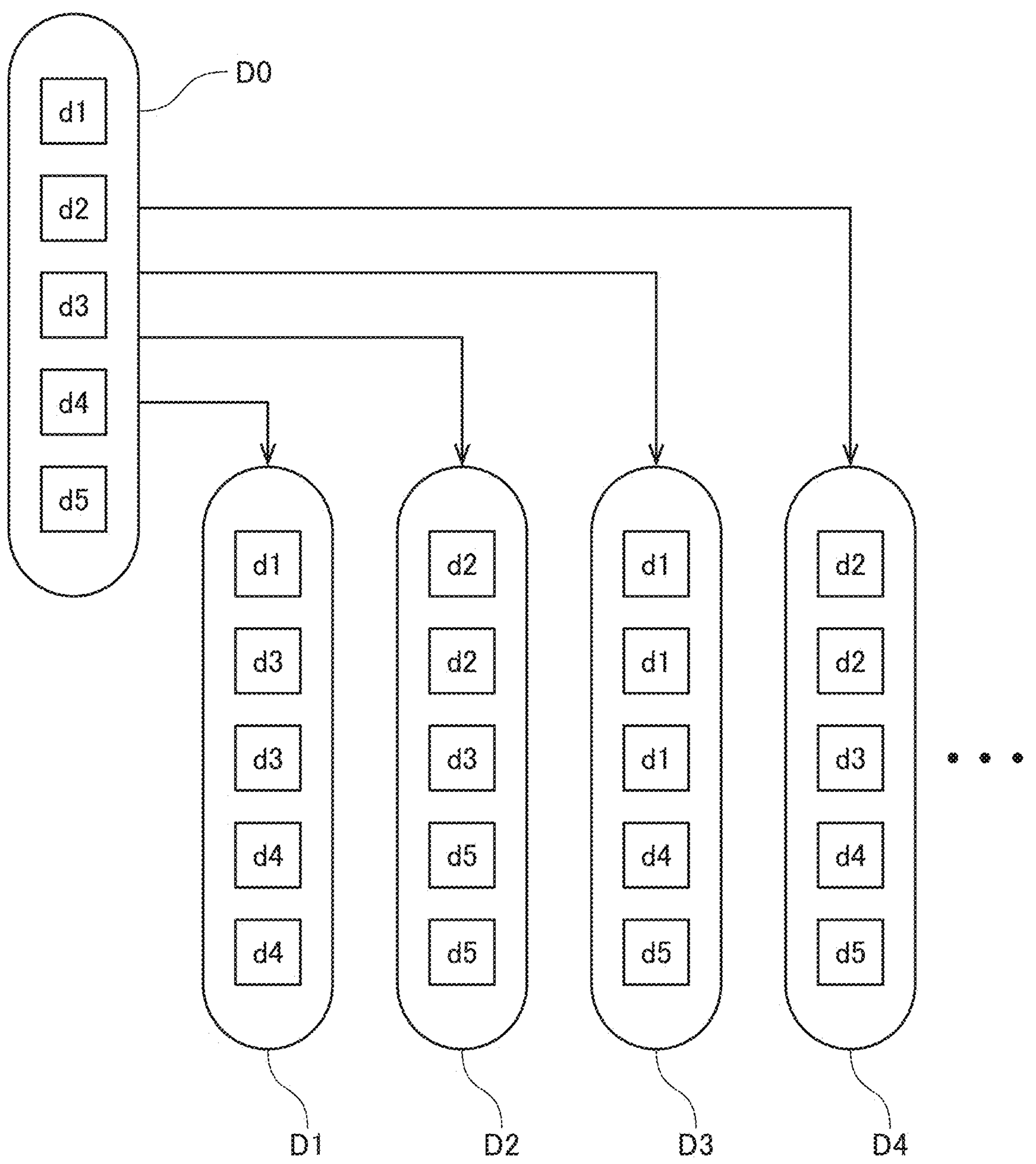
FIG. 5 conceptually shows a process in step S3.

Next, the resampling part 42 of the computer 10 generates a plurality of sample datasets D1, D2, D3, . . . from the original dataset D0 (step S3). FIG. 5 conceptually shows a process in step S3. In the illustration in FIG. 5, the original dataset D0 contains five numerical value groups d1 to d5. As shown in FIG. 5, using the original dataset D0 as a population, the resampling part 42 randomly extracts the numerical value groups d1, d2, d3, . . . a predetermined number of times through sampling with replacement, thereby generating the sample datasets D1, D2, D3, . . . .

In the illustration in FIG. 5, the number of the numerical value groups d1, d2, d3, . . . contained in the original dataset D0 and the number of numerical value groups contained in each of the sample datasets D1, D2, D3, . . . are equal to each other (both of these numbers are five). However, the number of the numerical value groups contained in each of the sample datasets D1, D2, D3, . . . may differ from the number of the numerical value groups d1, d2, d3, . . . contained in the original dataset D0.

According to the sampling with replacement, after one numerical value group is extracted from the original dataset D0, this numerical value group again becomes a target of extraction without being deleted from the original dataset D0. For this reason, as shown in FIG. 5, a single sample dataset may contain two or more numerical value groups identical to each other. In another case, some of the numerical value groups d1, d2, d3, . . . contained in the original dataset D0 may be absent in a single sample dataset.

In this way, the resampling part 42 generates the plurality of sample datasets D1, D2, D3, . . . from the original dataset D0. This makes it possible to increase the number of datasets to be subjected to causality search.

Next, the causality searching part 43 of the computer 10 conducts causality search on each of the plurality of sample datasets D1, D2, D3, . . . (step S4). The causality searching part 43 analyzes a causal relationship between the variables X1, X2, X3, . . . in each of the sample datasets D1, D2, D3, . . . according to a statistical causality search algorithm. Then, the causality searching part 43 generates a causal graph G about each of the sample datasets D1, D2, D3, . . . showing a causal relationship between the variables X1, X2, X3, . . . visually. The output part 46 displays the generated causal graph G on the display unit 20.

As the statistical causality search algorithm used for generating the causal graph G, DirectLINGAM, ICA-LINGAM, BottomUpParceLINGAM, RCD, or CAM-UV may be used, for example. If the presence or absence of a causal relationship between some of the variables is known, this relationship may be input as previous knowledge to the computer 10 by the user. In this case, the causality searching part 43 conducts causality search while complying with constraint by the input previous knowledge.

Figure 6:
FIG. 6 shows an example of a causal graph.
Figure 6:
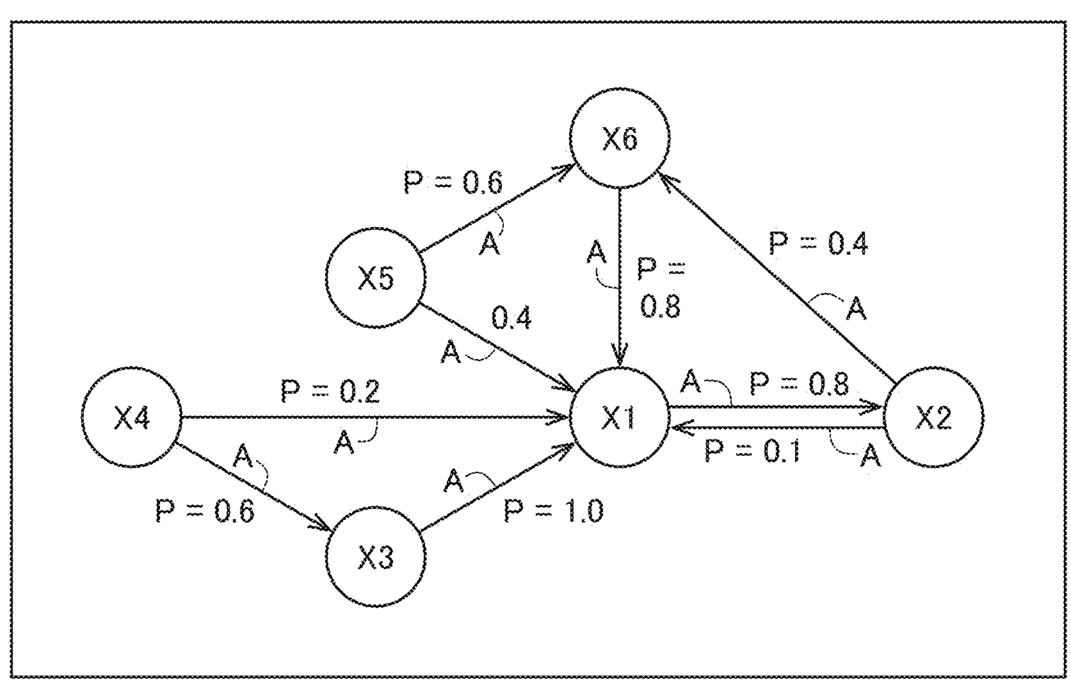

FIG. 6 shows an example of the causal graph G. As shown in FIG. 6, the causal graph G is an image showing a causal relationship between the variables X1, X2, X3, . . . using a directed edge A (arrow). In the causal graph G in FIG. 6, causal relationships between six variables X1 to X6 are indicated by the directed edges A. A base end side of the directed edge A is a variable (cause) to exert an impact. A tip side of the directed edge A is a variable (effect) to be impacted.

The causality searching part 43 generates the causal graph G about each of the plurality of sample datasets D1, D2, D3, . . . . In the causal graph G generated by conducting causality search on a single sample dataset, one directed edge or no directed edge is present between two variables, so that a loop is not formed by a plurality of directed edges A. As shown in FIG. 6, however, displaying every directed edge A generated by conducting causality search on the plurality of sample datasets D1, D2, D3, . . . may result in a situation where two directed edges A are present between two of the variables or a loop is formed by some directed edges A.

The causality searching part 43 calculates a probability of occurrence P of each directed edge A in the plurality of resultant causal graphs G. The probability of occurrence P is a ratio of a frequency of occurrence of the directed edge A to the number of the generated causal graphs G (the number of the sample datasets). Then, the causality searching part 43 adds the probabilities of occurrence P to all the directed edges A in the causal graph G, as shown in FIG. 6. The user of the causality search system 1 is allowed to suppose the reliability of each directed edge A by referring to these probabilities of occurrence P.

Next, on the basis of the plurality of causal graphs G generated in step S4, the causal graph determining part 44 determines a single causal graph G (step S5). The causality search system 1 of the present preferred embodiment has three processing modes as follows as a processing mode in step S5: a "graph selection mode," an "automatic directed edge selection mode," and a "manual directed edge selection mode." The user of the causality search system 1 is allowed to switch between the "graph selection mode," the "automatic directed edge selection mode," and the "manual directed edge selection mode" by operating the input unit 30.

Figure 7:
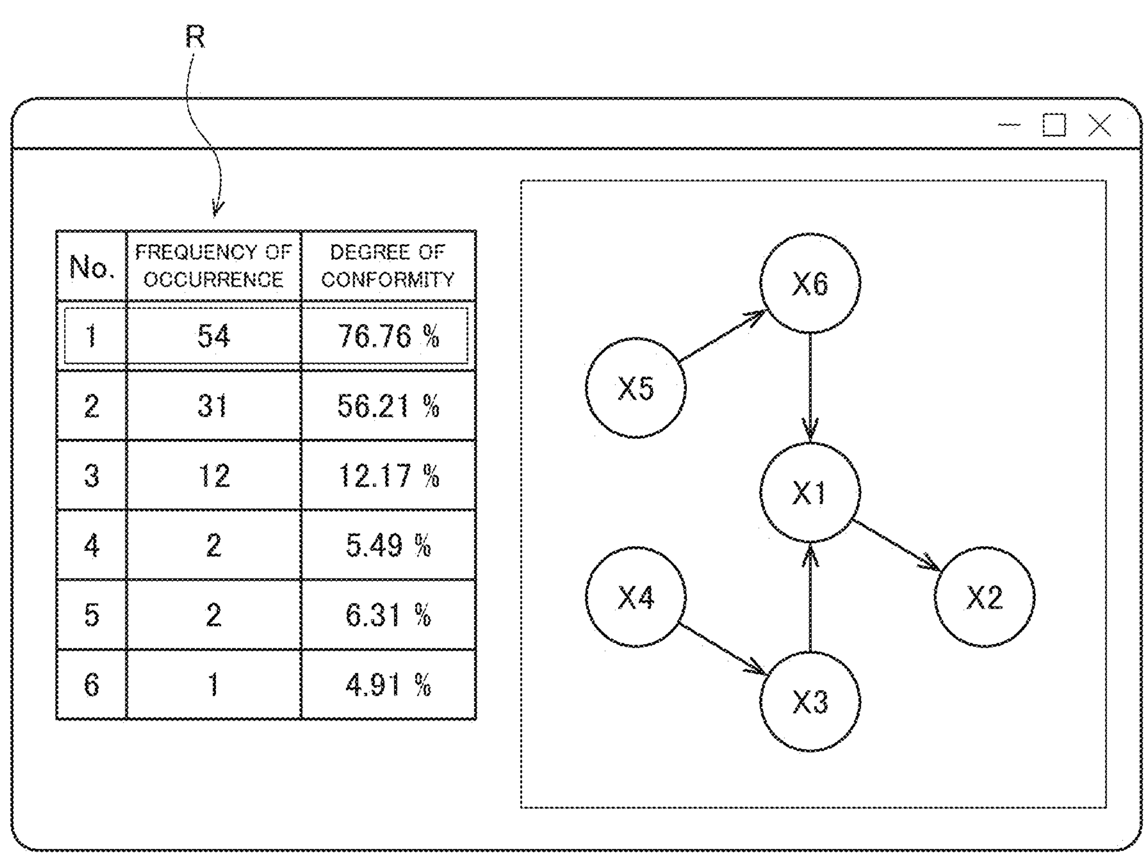
FIG. 7 shows an example of a screen appearing on a display unit when a "graph selection mode" is selected.

FIG. 7 shows an example of a screen appearing on the display unit 20 when the "graph selection mode" is selected. The "graph selection mode" is a mode in which a causal graph G to be used as the single causal graph G described above is selected from the plurality of causal graphs G obtained in step S4. The causal graph determining part 44 counts a frequency of occurrence of an identical causal graph G out of the plurality of causal graphs G. The identical causal graph G means causal graphs G that are completely identical in the number of directed edges A, and the positions and directions of the directed edges A.

As shown in FIG. 7, the causal graph determining part 44 displays respective frequencies of occurrence of the causal graphs G in descending order in a form of a ranking list R. In the illustration in FIG. 7, the highest frequency of occurrence of the causal graph G is 54. The causal graph G of a high frequency of occurrence is supposed to have high reliability. The user of the causality search system 1 selects the single causal graph G while taking the frequencies of occurrence displayed in the ranking list R into consideration. Thus, it becomes possible to reduce a work burden on the user to select the causal graph G.

In the illustration in FIG. 7, when the user selects any row in the ranking list R, the causal graph G in a corresponding rank is displayed on the right. This allows the user to select the causal graph G considered to be most appropriate while checking the causal graph G visually.

In the illustration in FIG. 7, a degree of conformity is displayed in the ranking list R together with a frequency of occurrence. The degree of conformity is an index indicating a degree of conformity of the causal graph G to the original dataset D0. The degree of conformity may be calculated using root mean square error of approximation (RMSEA), a likelihood, Akaike's Information Criterion (AIC), or deviance information criterion (DIC), for example. The user of the causality search system 1 selects the single causal graph G while taking the degree of conformity displayed in the ranking list R into consideration. Thus, it becomes possible to further reduce a work burden on the user to select the causal graph G.

The ranking list R may show degrees of conformity of the causal graphs G in descending order. The ranking list R showing ranking of frequencies of occurrence and the ranking list R showing ranking of degrees of conformity may be switched from each other in response to selection by the user.

Figure 8:
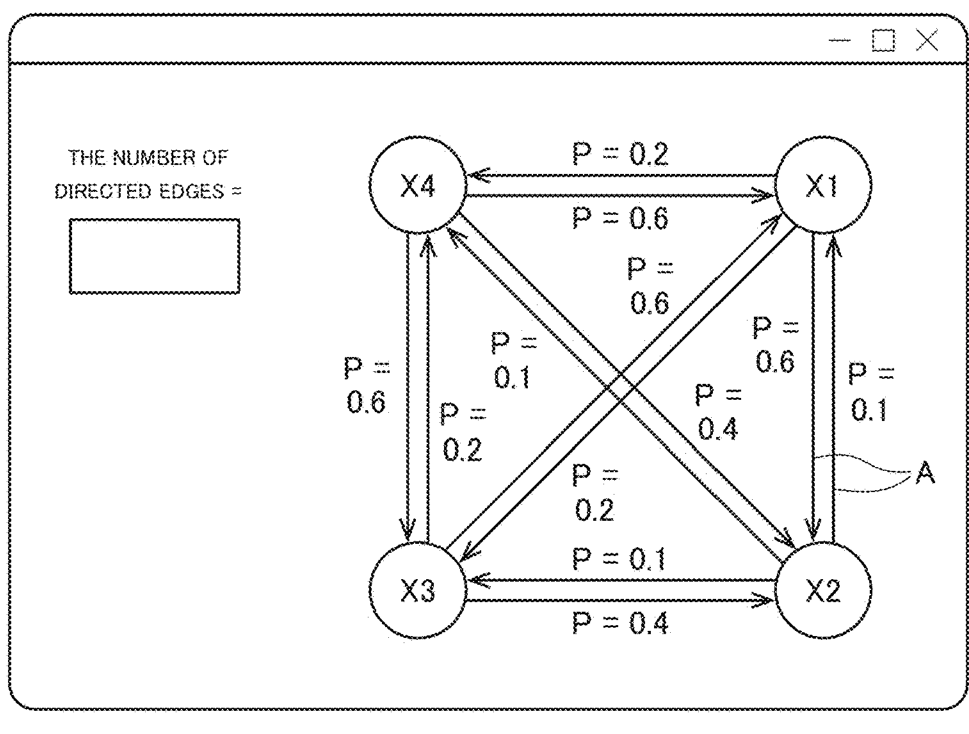
FIG. 8 shows an example of a screen appearing on the display unit when a "first directed edge selection mode" is selected.
Figure 8:
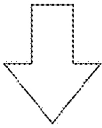
Figure 8:
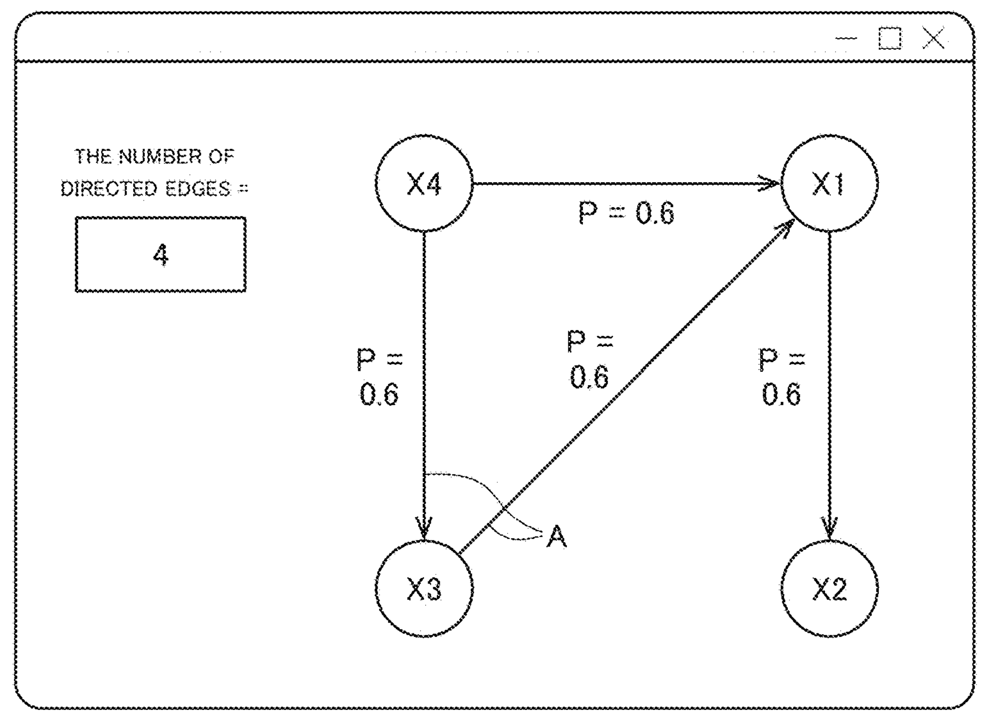

FIG. 8 shows an example of a screen appearing on the display unit 20 when the "automatic directed edge selection mode" is selected. The "automatic directed edge selection mode" is a mode in which the directed edge A to be used in the single causal graph G is selected automatically on the basis of a condition designated by the user from the plurality of directed edges A obtained in step S4.

As described above, in step S4, the probability of occurrence P is calculated about each of a large number of the directed edges A contained in the plurality of causal graphs G. As shown in the upper view of FIG. 8, the causal graph determining part 44 first displays the probabilities of occurrence P of all the directed edges A between the plurality of variables X1, X2, X3, . . . .

Next, the user operates the input unit 30 to input the number of the directed edges A to be selected. In response to this, as shown in the lower view of FIG. 8, the causal graph determining part 44 displays only the designated number of the directed edges A having the probabilities of occurrence P in higher ranks and hides the other directed edges A. In this way, the directed edges A of a predetermined number that are high in the probability of occurrence P are selected automatically by the computer 10. Thus, it becomes possible to reduce a work burden on the user to select the directed edge A.

The user of the causality search system 1 may designate a threshold for the probability of occurrence P instead of the number of the directed edges A to be selected. In this case, the causal graph determining part 44 displays only the directed edge A having the probability of occurrence P equal to or greater than the designated threshold, and hides the other directed edges A. As an example, the causal graph G in the lower view of FIG. 8 may be obtained by designating 0.5 as the threshold for the probability of occurrence P in the upper view of FIG. 8.

When all the directed edges A are displayed like in the upper view of FIG. 8, two directed edges A may be present between two variables or a loop may be formed by some of the directed edges A. By adjusting the number of the directed edges A to be selected, however, the user of the causality search system 1 is allowed to generate the causal graph G without an unsuitable situation such as a loop, like in the lower view of FIG. 8.

Figure 9:
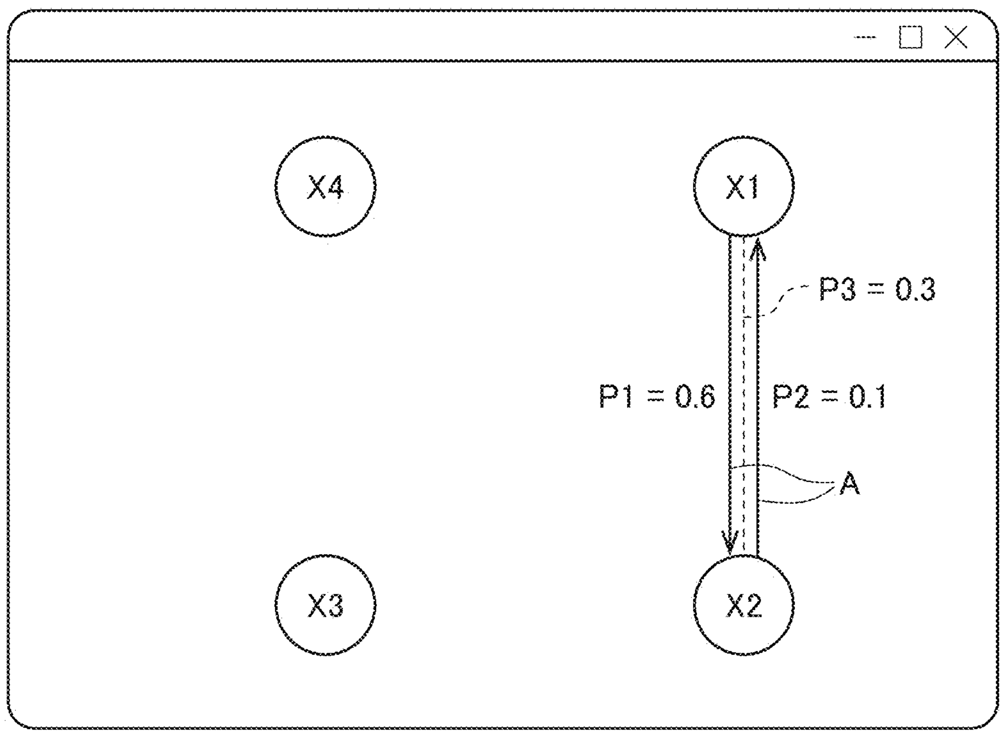
FIG. 9 shows an example of a screen appearing on the display unit when a "second directed edge selection mode" is selected.

FIG. 9 shows an example of a screen appearing on the display unit 20 when the "manual directed edge selection mode" is selected. The "manual directed edge selection mode" is a mode in which the user checks and selects the directed edge A to be used in the single causal graph G from the plurality of directed edges A obtained in step S4.

As shown in FIG. 9, in the "manual directed edge selection mode," a probability of occurrence P1, a probability of occurrence P2, and a probability of occurrence P3 are displayed in connection with the two variables X1 and X2. The probability of occurrence P1 is of a directed edge (first directed edge) directed from one variable X1 toward the other variable X2. The probability of occurrence P2 is of a directed edge (second directed edge) directed from the other variable X2 toward the one variable X1. The probability of occurrence P3 is of a state without the directed edge A between the two variables X1 and X2.

The user of the causality search system 1 selects the first directed edge, the second directed edge, or the state without the directed edge A as the directed edge A between the two variables X1 and X2 by referring to the probabilities of occurrence P1, P2, and P3. The causal graph determining part 44 provides display in the same way about each combination of two variables contained in the original dataset D0, and urges the user to select the directed edge A. As a result, it becomes possible to determine each directed edge A between the variables while taking the probability of occurrence P into consideration. Thus, it becomes possible to reduce a work burden on the user to select the directed edge A.

As described above, in the causality search system 1, the plurality of sample datasets D1, D2, D3, . . . is generated from the single original dataset D0. Then, the single causal graph G is determined from the plurality of causal graphs G generated on the basis of the sample datasets D1, D2, D3, . . . . Thus, even if the data quantity of the original dataset D0 is small, it is still possible to obtain the causal graph G having high reliability.

In the causality search system 1, the "graph selection mode," the "automatic directed edge selection mode," and the "manual directed edge selection mode" are switchable to each other in determining the single causal graph G. This makes it possible to determine the causal graph G without an unsuitable situation such as a loop while reducing a work burden on the user. The computer 10 stores the determined causal graph G into the storage part 13 and displays the determined causal graph G on the display unit 20.

When the single causal graph G is determined, a causal inference is finally made on the basis of the determined causal graph G (step S6). In step S6, the causal inferring part 45 performs an intervening process on the causal graph G. In the intervening process, one variable out of the plurality of variables X1, X2, X3, . . . is changed, for example. Then, the causal inferring part 45 changes a value of a different variable on the basis of a causal relationship indicated by the causal graph G. Then, the causal inferring part 45 displays the change in this variable on the display unit 20 through the output part 46. By doing so, the user of the causality search system 1 is allowed to see how change in one variable exerts an impact on a different variable.

<2. Modifications>

While the preferred embodiment of the present invention has been described above, the present invention is not limited to the above-described preferred embodiment.

The causality search system 1 of the above-described preferred embodiment has the three processing modes as follows as a processing mode in step S5: the "graph selection mode," the "automatic directed edge selection mode," and the "manual directed edge selection mode." Namely, the causality search system 1 of the above-described preferred embodiment has two types of the "directed edge selection modes." However, the "directed edge selection mode" belonging to the causality search system 1 may be only one of the "automatic directed edge selection mode" and the "manual directed edge selection mode."

The causality search system 1 of the above-described preferred embodiment displays a frequency of occurrence or a degree of conformity of the causal graph G in a form of the ranking list R in the "graph selection mode". However, the causality search system 1 may display a frequency of occurrence or a degree of conformity of the causal graph G in a form other than the ranking list R.

All the elements appearing in the above-described preferred embodiment or modifications may be combined, as appropriate, within a range not causing inconsistency. As an example, in the process in step S5, two or more of the "graph selection mode," the "automatic directed edge selection mode," and the "manual directed edge selection mode" may be used in combination. More specifically, the causal graph G generated using the "graph selection mode" or the "automatic directed edge selection mode" may be corrected by adding or deleting the directed edge A between some of variables to or from this causal graph G using the function of the "manual directed edge selection mode," thereby finally determining the causal graph G to be used.

While the invention has been shown and described in detail, the foregoing description is in all aspects illustrative and not restrictive. It is therefore understood that numerous modifications and variations can be devised without departing from the scope of the invention.

What is claimed is:

1. A causality search system including a computer that searches for a causal relationship between variables based on an original dataset containing a plurality of variables, said computer performing:

(a) a process of generating a plurality of sample datasets from said original dataset through sampling with replacement;

(b) a process of obtaining a plurality of causal graphs each showing a causal relationship between said variables using a directed edge by conducting causality search on each of said plurality of sample datasets; and (c) a process of determining a single causal graph based on said plurality of causal graphs, wherein in said process (c), a graph selection mode and a directed edge selection mode are switchable to each other, the graph selection mode being a mode in which said plurality of causal graphs obtained by said process (b) are displayed in form of a list, and a causal graph to be used as said single causal graph is selected from said plurality of causal graphs by accepting input to select one row within said list, the directed edge selection mode being a mode in which a directed edge to be used in said single causal graph is selected from a plurality of the directed edges obtained by said process (b).

2. The causality search system according to claim 1, wherein in said graph selection mode, a frequency of occurrence of an identical causal graph out of said plurality of causal graphs obtained by said process (b) is displayed.

3. The causality search system according to claim 1, wherein in said graph selection mode, a degree of conformity of each of said plurality of causal graphs obtained by said process (b) to said original dataset is displayed.

4. The causality search system according to claim 1, wherein said process (b) calculates a probability of occurrence of each directed edge in said plurality of causal graphs, and in said directed edge selection mode, directed edges of a predetermined number that are high in said probability of occurrence are selected.

5. A causality search system including a computer that searches for a causal relationship between variables based on an original dataset containing a plurality of variables, said computer performing:

(a) a process of generating a plurality of sample datasets from said original dataset through sampling with replacement;

(b) a process of obtaining a plurality of causal graphs each showing a causal relationship between said variables using a directed edge by conducting causality search on each of said plurality of sample datasets; and (c) a process of determining a single causal graph based on said plurality of causal graphs, wherein in said process (c), a graph selection mode and a directed edge selection mode are switchable to each other, the graph selection mode being a mode in which a causal graph to be used as said single causal graph is selected from said plurality of causal graphs obtained by said process (b), the directed edge selection mode being a mode in which a directed edge to be used in said single causal graph is selected from a plurality of the directed edges obtained by said process (b), said process (b) calculates a probability of occurrence of each directed edge in said plurality of causal graphs, in connection with any two variables, a probability of occurrence of a first directed edge, a probability of occurrence of a second directed edge, and a probability of occurrence in a state without a directed edge are displayed in said directed edge selection mode, the first directed edge being directed from one of the variables toward the other variable, the second directed edge being directed from the other variable toward the one variable, and any one is selected from said first directed edge, said second directed edge, and said state without a directed edge.

6. A storage medium storing a causality search program that causes said computer of the causality search system according to claim 1 to perform said processes (a) to (c) by being installed on said computer.

* * * * *